United States Patent [19]

Rhudy et al.

[11] 4,234,433
[45] Nov. 18, 1980

[54] RECOVERY OF PETROLEUM WITH CHEMICALLY TREATED HIGH MOLECULAR WEIGHT POLYMERS

[75] Inventors: John S. Rhudy, Littleton; Connie L. Gibb, Evergreen, both of Colo.

[73] Assignee: Marathon Oil Company, Findlay, Ohio

[21] Appl. No.: 948,610

[22] Filed: Oct. 4, 1978

Related U.S. Application Data

[63] Continuation-in-part of Ser. No. 812,973, Jul. 5, 1977, abandoned.

[51] Int. Cl.$^3$ .............................................. E21B 43/22
[52] U.S. Cl. ............................... 252/8.55 D; 166/275
[58] Field of Search ................. 252/8.55 D; 166/252, 166/270, 274, 275, 305 R

[56] References Cited

U.S. PATENT DOCUMENTS

| | | | |
|---|---|---|---|
| 3,002,960 | 10/1961 | Kolodny | 252/8.55 X |
| 3,343,601 | 9/1967 | Pye | 166/275 X |
| 3,556,221 | 1/1971 | Haws et al. | 166/305 |
| 3,749,172 | 7/1973 | Hessert et al. | 166/274 |
| 3,822,746 | 7/1974 | Gogarty | 166/252 |
| 3,842,909 | 10/1974 | Rhudy et al. | 166/275 |

Primary Examiner—Herbert B. Guynn
Attorney, Agent, or Firm—Jack L. Hummel

[57] ABSTRACT

Plugging of reservoirs with high molecular weight polymers, e.g. partially hydrolyzed polyacrylamide, is overcome by chemically treating a polymer having an excessively high average molecular weight prior to injection into a reservoir with an oxidizing chemical, e.g. sodium hypochlorite, and thereafter incorporating a reducing chemical, e.g., sodium sulfite, to stop degradation of the polymer when a desired lower average molecular weight and flooding characteristics are attained.

11 Claims, No Drawings

RECOVERY OF PETROLEUM WITH CHEMICALLY TREATED HIGH MOLECULAR WEIGHT POLYMERS

CROSS-REFERENCE TO RELATED APPLICATIONS

This application is a continuation-in-part of our copending United States Patent Application Ser. No. 812,973, filed July 5, 1977, now abandoned.

FIELD OF THE INVENTION

This invention relates to a process for tailoring the characteristics of polymers used in oil or water reservoir treatments. More particularly, it relates to a process for flooding the reservoir with aqueous solutions of high molecular weight polymers and it even more particularly relates to chemically treating the aqueous solutions to be injected into the formation.

BACKGROUND OF THE INVENTION

Mobility control in secondary-type oil recovery is dependent upon many factors which have different degrees of effect on the reservoir. Some of the most significant factors are the formation rock type, the permeability range, the mobility control agent, solution viscosity and the connate water chemistry. If the formation rock type and connate water composition are known, and if the polymer resistance factor can be adjusted without unduly plugging the formation, mobility control can be optimized.

A low concentration of high molecular weight, water-soluble polymer improves the mobility control of water injected into oil reservoirs. Reduced water mobility occurs partially by viscosity increase and partially by reduction of the reservoir permeability. Reduction of permeability is of different magnitudes for various polymer solutions. Retention by mechanical entrapment occurs at pore constrictions and accounts for most of the permeability reduction but adsorption also causes some of the polymer to be retained. The concentration difference between the entering and leaving polymer solutions in the reservoir approaches zero as stabilization occurs. Finally stabilization takes place and the permeability remains constant at a lower than original level. After stabilization, the polymer solution injected into the reservoir moves through the large pore openings. If the polymer molecules are either too large, extensively cross-linked or extensively entangled, retention of polymer molecules can cause more plugging than desired.

Polymers available on the market will seldom provide the exact solution properties optimum for a given flooding operation. Degrading substantially all the molecules of a polymer available on the market with an exessively high average molecular weight is a viable method of obtaining the qualities necessary for a flooding operation. There are many methods taught in the prior art which relate to or attempt to alleviate the problem.

U.S. Pat. No. 3,709,297 teaches the injection of a slug of dilute aqueous polyacrylamide solution into an oil-containing formation followed by injection of a slug of dilute aqueous solution of an alkali metal hypochlorite to improve the injectivity.

U.S. Pat. No. 3,343,601 teaches the addition of water-soluble hydrosulfite, an oxygen scavenger, to a polymer mobility control agent to reduce the plugging of formations by ferric hydroxide.

U.S. Pat. No. 3,842,909 issued to Rhudy et al teaches a process wherein a portion of a polymer having an average molecular weight at least 1.2 times greater than the actual molecular weight needed to make up an aqueous solution is degraded mechanically prior to injection.

U.S. Pat. No. 3,556,221 teaches the use of NaOCl to reduce plugging adjacent a well bore.

The presence of free oxygen or oxidizing agents in the polymer solution is identified with polymer degradation. Reducing agents are used to counteract the effect of polymer degradation induced by oxidation-reduction reactions. None of the art, however, combines these agents to ensure that the resultant solution provides effective mobility control. The limitations of the prior art are overcome by the present invention which insures optimum mobility control without excessive plugging of the reservoir.

SUMMARY OF THE INVENTION

Excessively high molecular weight polymer solutions are treated prior to or during injection with an oxidizing agent, e.g., sodium hypochlorite, until degradation to a predetermined average molecular weight has occurred. The degradation ceases on introduction of a reducing agent, e.g., sodium sulfite, prior to or during injection.

DESCRIPTION OF THE PREFERRED EMBODIMENTS

Maintenance of mobility control without wasteful plugging of formation rock near a wellbore is possible. Cores which have been taken from the reservoir of interest are flooded with aqueous polymer solutions to determine the optimal average molecular weight polymer that can be injected without excessive plugging of the core. Polymers which have desired solution properties, e.g., screen factors and viscosities, are chosen.

Polymers which cause substantial reservoir permeability reduction by excessive retention of high molecular weight molecules may be degraded by oxidizing chemicals including, but not limited to, a compound of a formula MOX wherein M is an alkali metal or ammonium and X is a halogen (e.g., potassium hypochlorite) and inorganic or organic peroxides (e.g., hydrogen peroxide or tertiary butyl hydroperoxide). The preferred oxidizing agent is sodium hypochlorite. Haws, Rael and Rhudy, in U.S. Pat. No. 3,556,221, teach the injection of hypochlorite to stimulate injection wells plugged by a polymer. The amount of degradation can be controlled by (1) the amount of oxidizing agent added and (2) the contact time with the polymer. Table I in Example I shows the effect of varying the concentration of an oxidizing agent (NaOCl) on solution properties of 1,000 ppm Dow Pusher 700 (a partially hydrolyzed high molecular weight polyacrylamide marketed under the "Pusher" trade name by Dow Chemical Company) in fresh water. Increasing concentrations of salt decrease the apparent viscosity and non-Newtonian character of the polymer solution.

Table II in Example II shows the effect of varying the reaction time on degradation (using NaOCl) of a 1000 ppm Dow Pusher 700 solution in fresh water. The degradation increases with time using a fixed amount of oxidizing agent (35 ppm NaOCl) in this example. Therefore, with two parameters affecting the level of degradation, there is sufficient latitude to adapt the present invention to a given flooding operation.

A reducing agent is then added to the solution to stop degradation and stabilize the polymer solution at a desired average molecular weight. Reducing agents used in the practice of this invention include but are not limited to water-soluble compounds such as alkali metal sulfites (e.g., sodium sulfite), alkali metal hydrosulfites (e.g., sodium hydrosulfite), alkali metal sulfides and bisulfides (e.g., sodium sulfide), alkali metal bisulfites (e.g., sodium bisulfite) and potassium metabisulfite. Other compounds such as ferrous sulfate, thioacetamide, hydrogen sulfide, hydroquinone, hydrazine phospite, hydrazine dichloride, ferrous chloride, p-hydrazinobenzoic acid, formaldehyde and alkali metal thiosulfates (e.g., sodium thiosulfate), may also be useful. The preferred reducing agent is sodium hydrosulfite. In short, compounds having the general formula $M_2SO_3$, $M_2S_2O_3$ and $M_2S_2O_4$, where M is an alkali metal or ammonium and formaldehyde, are useful in this invention. The amount of reducing agent used should be 10 to 1000 ppm, preferably 20 ppm to 100 ppm, and most preferably 25 ppm to 50 ppm greater than the stoichiometric amount necessary to reduce the oxidizing agent.

It is preferred that the invention be practiced in a closed system where oxygen from the atmosphere or other source does not cause further degradation after addition of the reducing agent. This is particularly true when sodium hydrosulfite is used as a reducing agent.

It is preferred to practice this invention at the injection well site. The oxidizing agent can be added to polymer solution as it is being pumped at one point and the reducing agent at another point downstream at the time of injection so that, with flow rates taken into consideration, the proper time would have elapsed before the addition of the reducing agent.

Other adaptations than those specifically taught can be used in the practice of this invention. Therefore, other embodiments of the inventive concept are also intended to be included within the scope of this invention.

The following examples further illustrate the invention:

EXAMPLE I

To a 1000 ppm Pusher 700 (partially hydrolyzed polyacrylamide) polymer solution in fresh water, Clorox (a trademark of The Clorox Company, Oakland, California, containing 5–6% NaOCl) is added at different concentrations. Solution properties after Clorox addition are shown in Table I:

TABLE I

| Clorox* Added | Reaction Time | Screen Factor | Screen Factor Degradation | Viscosity | Viscosity Degradation |
|---|---|---|---|---|---|
| 1.0 | 15 min. | 3.6 | 87% | 8.3 cp | 81% |
| 0.5 | 15 min. | 5.6 | 80% | 15.0 cp | 66% |
| 0.3 | 15 min. | 19.6 | 26% | 36.5 cp | 15% |
| 0.3 | 3 hr. | 16.8 | 37% | 34.8 cp | 20% |
| 0.2 | 3 hr. | 24.7 | 11% | 40.5 cp | 8% |

*mls Clorox per 500 ml polymer solution
Note in Table I that the degradation increases with the amount of oxidizing agent added with reaction time being held constant.

EXAMPLE II

The amount of degradation can also be controlled by the reaction time with the oxidizing agents. Table II shows solution properties with time after 0.3 ml Clorox is added to 500 ml of 1000 ppm Pusher 700 in fresh water.

TABLE II

| Clorox Reaction Time | Screen Factor | Screen Factor Degradation | Viscosity | Viscosity Degradation |
|---|---|---|---|---|
| 15 min. | 19.6 | 26% | 37.5 cp | 14% |
| 1 hr. | 18.2 | 31% | 36.5 cp | 15% |
| 3 hr. | 16.8 | 37% | 34.8 cp | 20% |
| 24 hr. | 13.9 | 48% | 31.1 cp | 29% |
| 95 hr. | 11.1 | 58% | 26.7 cp | 39% |

EXAMPLE III

To a 500 ml sample of 1000 ppm Pusher 700 in fresh water, 0.3 ml of Clorox (approximately 35 ppm NaOCl) is added. Fifteen minutes later 58 ppm of sodium sulfite (reducing agent) is added. This amount is stoichiometrically in excess of that required to react with the remaining oxidizing agent. Solution properties as a function of time are shown in Table III.

TABLE III

| Time | Screen Factor | Viscosity |
|---|---|---|
| 15 min. | 19.6 | 34.5 cp |
| 20 hr | 17.2 | 32.7 cp |
| 90 hr | 16.0 | 31.6 cp |

Solutions shown in Tables II and III are identical except $Na_2SO_3$ was added to solutions in Table II. By comparing screen factors and viscosities in Tables II and III, it is seen that the reducing agent ($Na_2SO_3$) stops further degradation of the polymer solution by the oxidizing agent.

In Table III the solution properties did decrease slightly. This slight loss can be attributed to (1) increased water salinity after adding 58 ppm $Na_2SO_3$ to the polyelectrolyte solution and (2) free-radical degradation due to reaction of the excess of $Na_2SO_3$ with oxygen contamination.

What we claim is:

1. In a process of flooding an oil-bearing subterranean formation in communication with injection means and production means, wherein an aqueous, high molecular weight polymer solution is injected into the formation to displace oil toward the producing means, the improvement comprising:
   (a) reacting in an aqueous solution a polymer-oxidizing oxidant selected from the group consisting of peroxides and compounds of the formula MOX wherein M is an alkali metal or ammonium and X is a halogen with a polymer of average molecular weight sufficiently high to cause substantial plugging of the reservoir on injection in aqueous solution to reduce the polymer to an average molecular weight which does not cause substantial plugging during injection into the reservoir,
   (b) thereafter reacting a reducing agent with the polymer of reduced average molecular weight to terminate degradation by the oxidant at a predetermined average molecular weight,
   (c) injecting an aqueous solution of the degraded polymer into the reservoir through the injection means, and
   (d) displacing said aqueous degraded polymer solution a substantial distance into or through said formation.

2. The process of claim 1 wherein the polymer is a partially hydrolyzed high molecular weight polyacrylamide.

3. The process of claim 1 wherein the oxidizing agent is a compound of the formula MOX wherein M is an alkali metal or ammonium and X is a halogen.

4. The process of claim 1 wherein the oxidizing agent is taken from the group consisting of inorganic peroxides and organic peroxides.

5. The process of claim 1 wherein said reducing agent is taken from the group consisting of compounds of the formulae $M_2SO_3$, $M_2S_2O_4$ and $M_2S_2O_3$ wherein M is an alkali metal or ammonium and formaldehyde.

6. In a process for reducing the ability of a polymer to plug a reservoir, the steps comprising:
    (a) injecting into cores substantially representative of said reservoir, aqueous solutions of high molecular weight polymer treated prior to or during injection into said core with a predetermined amount of oxidizer selected from the group consisting of peroxides and compounds of the formula MOX wherein M is an alkali metal or ammonium and S is a halogen,
    (b) reacting said oxidizer with said polymer for predetermined periods of time to form degraded polymer,
    (c) reacting the degraded polymer with sufficient reducing agent to insure substantially no further degradation of the polymer to stabilize the polymer solution,
    (d) injection of the stabilized polymer solution into the core to determine mobility control characteristics of the stabilized polymer solution with respect to said core, and thereafter
    (e) injecting into an oil-bearing reservoir to displace oil therefrom a stabilized, degraded polymer solution having predetermined characteristics, said characteristics having been established through use of steps a-d above.

7. The process of claim 6 wherein the oxidizing agent is a compound of the formula MOX wherein M is an alkali metal or ammonium and X is a halogen.

8. The process of claim 6 wherein the oxidizing agent is an organic or inorganic peroxide.

9. The process of claim 6 wherein the peroxide is hydrogen peroxide.

10. The process of claim 6 wherein the reducing agent is taken from the group consisting of alkali metal sulfites, alkali metal hydrosulfites, alkali metal thiosulfites, alkali metal sulfides, alkali metal bisulfides, alkali metal bisulfites, alkali metal thiosulfates, ferrous sulfate, thioacetamide, hydrogen sulfide, hydroquinone, hydrazine phosphate, hydrazine dichloride, p-hydrazinobenzoic acid, and formaldehyde.

11. The process of claim 6 wherein the polymer is a partially hydrolyzed high molecular weight polyacrylamide.

* * * * *